Aug. 12, 1958
J. E. HALL
2,847,228
WHEEL SUSPENSION FOR TRAILERS
Filed May 3, 1954
2 Sheets-Sheet 1
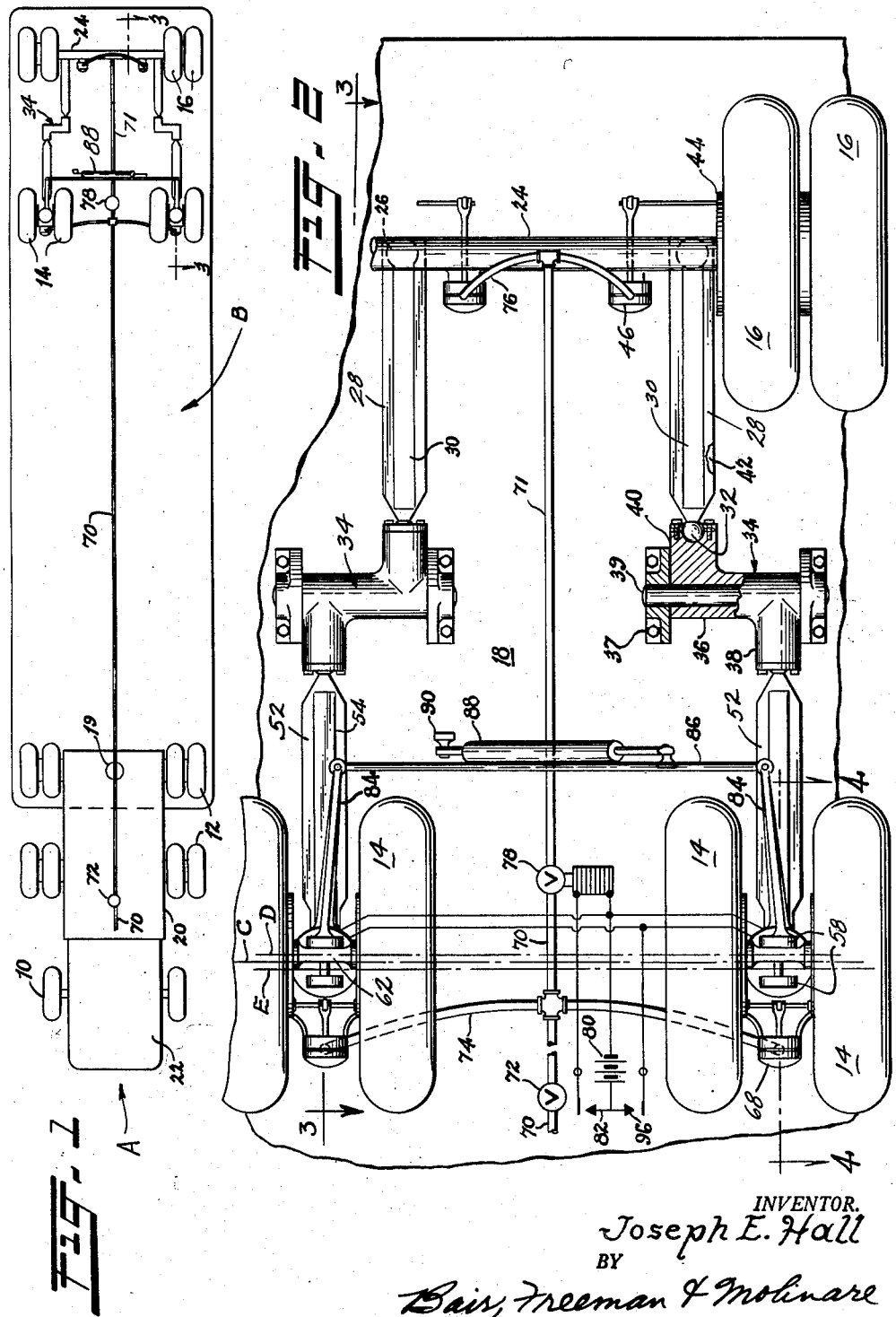
INVENTOR.
Joseph E. Hall
BY
Bair, Freeman & Molinare
Atty's.

Aug. 12, 1958  J. E. HALL  2,847,228
WHEEL SUSPENSION FOR TRAILERS
Filed May 3, 1954  2 Sheets-Sheet 2
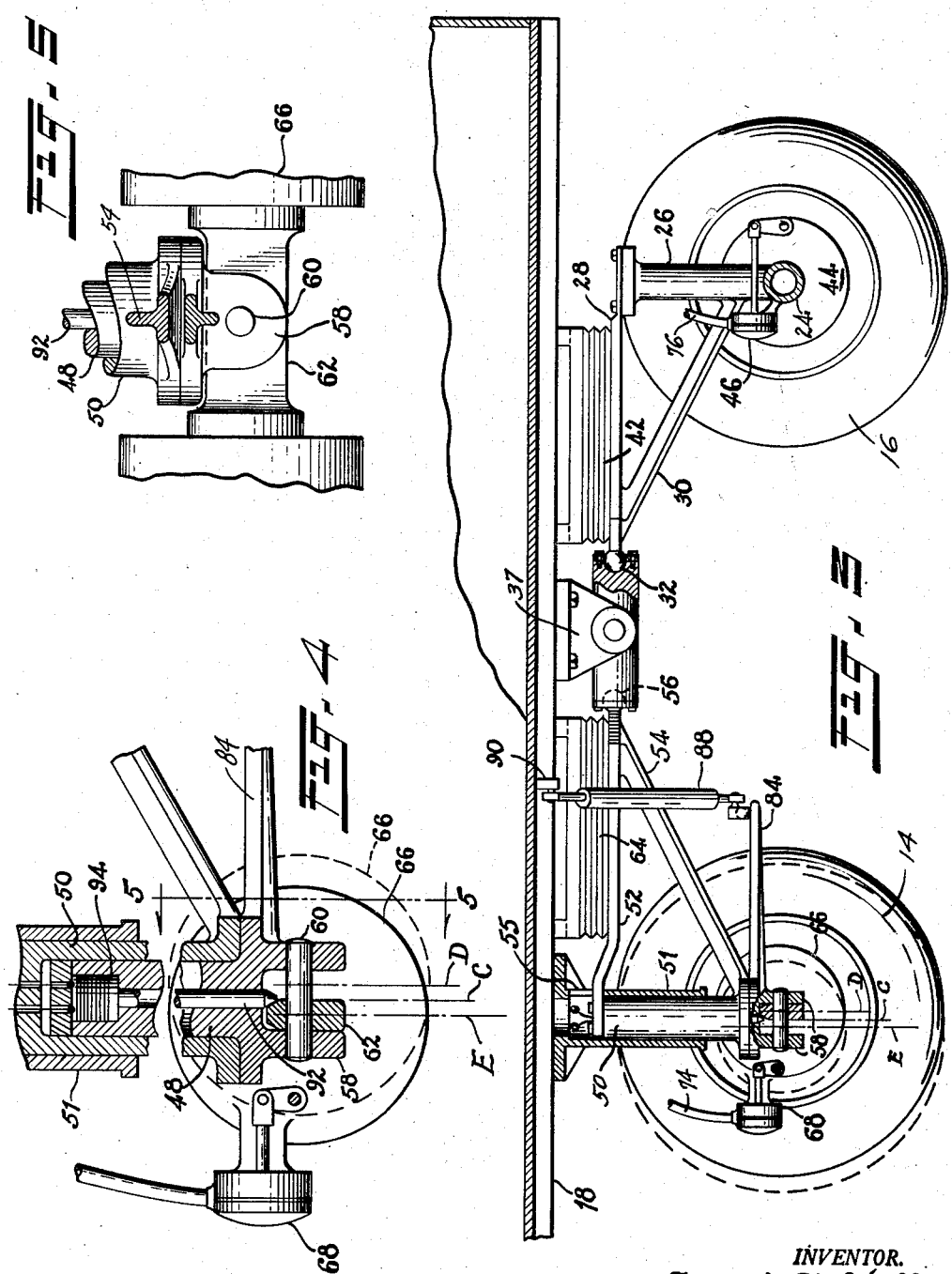
INVENTOR.
Joseph E. Hall
BY
Bair, Freeman & Molinare
Attys.

United States Patent Office
2,847,228
Patented Aug. 12, 1958

2,847,228

WHEEL SUSPENSION FOR TRAILERS

Joseph E. Hall, Waterloo, Iowa

Application May 3, 1954, Serial No. 427,107

2 Claims. (Cl. 280—81)

This invention relates to a wheel suspension for trailers, semi-trailers and the like.

One object of the invention is to provide an arrangement of fore and aft wheel suspensions wherein one of the suspensions (preferably for the fore wheels) is provided with castering mounts and the other suspension is non-steerably mounted in a manner so that the wheels thereof do not caster, the mountings of the castered wheels being of novel construction whereby castering can be reversed for backing up the trailer or semi-trailer.

Another object is to provide an arrangement that utilizes the power of the tractor that pulls the trailer or semi-trailer for shifting the castering action forwardly or rearwardly as desired by the driver of the tractor.

Still another object is to provide a castering arrangement for the wheels of a suspension system that involves a set of fore wheels and aft wheels wherein one set of wheel axes is shiftable to a position selectively either ahead of or behind the castering axis.

A further object is to provide means for shifting the wheel axes relative to the casternng axes comprising selective operation of brakes on the wheels so that they can be applied for the castering wheels and the tractor then moved in the appropriate direction for effecting the shifting of the castering wheel axes relative to the castering axes after which the brakes of these wheels may be released and the direction of movement continued.

Still a further object is to provide a relatively simple selective control comprising means to cut off the supply of actuating fluid to the non-castering wheels while permitting its flow to the castering wheels prior to the shifting of the castering wheel axes relative to the castering axes.

An additional object is to provide means for locking the castering wheels in castering position and unlocking them when it is desired to shift from one castering position to the other.

With these and other objects in view, my invention consists in the construction, arrangement and combination of the various parts of my wheel suspension for trailers, whereby the objects above contemplated are attained, as hereinafter more fully set forth, pointed out in my claims and illustrated in detail on the accompanying drawings, wherein:

Fig. 1 is a bottom plan view (diagrammatic) showing a tractor and a semi-trailer with my wheel suspension applied to the semi-trailer.

Fig. 2 is a partial bottom plan view of my wheel suspension on an enlarged scale relative to Fig. 1.

Fig. 3 is a sectional view thereof on the line 3—3 of Fig. 2.

Fig. 4 is an enlargement of the lower left corner of Fig. 3 as taken on the line 4—4 of Fig. 2 showing details of construction and a different position of the parts; and Fig. 5 is a vertical sectional view on the line 5—5 of Fig. 4.

On the accompanying drawings I have used the reference character A to indicate in general a tractor and B a semi-trailer. The tractor A is provided with front wheels 10 and rear wheels 12 whereas the semi-trailer is provided with fore wheels 14 and aft wheels 16. The chassis of the semi-trailer is shown at 18 and in Fig. 1 the cab section of the tractor A is shown at 20 while the engine section thereof is shown at 22. The semi-trailer is pivoted to the tractor at 19.

An axle 24 is provided for the aft wheels 16 and a pair of posts 26 extend upwardly therefrom. Arms 28 are connected to the upper end of the posts and the posts are braced relative thereto as at 30. The arms 28 terminate in balls 32.

A pair of walking beams 34 are provided and each one consists of a cross member 36 and fore and aft arms 38 and 40 respectively. Pivot shafts 39 extend through the cross-members 36 and are each supported by a pair of brackets 37 extending downwardly from the chassis 18.

Aft wheel springs 42 are shown which may be of the pneumatic type. The aft wheels 16 are provided with brakes 44 and these are actuated by brake actuators 46 which may be of pneumatic or hydraulic type.

For the fore wheels 14 castering posts 48 are provided and these are oscillatably received in post receiving tubes 50. The tubes 50 are slidably received in stationary posts 51 secured to the under side of the chassis 18. A pair of arms 52 extend rearwardly from the upper ends of the stationary posts 51 and are braced as at 54.

A fore wheel spring 64 is provided for each arm 52. The posts 51 are provided with slots 55 through which the arms 52 extend and the arms slide vertically therein while their rear ends are provided with balls 56. The balls 56 are journalled in the fore arms 38 of the walking beams 34 whereas the balls 32 of the arms 28 are journalled in the aft arms 40 of the walking beams.

Extending downwardly from the lower end of each castering post 48 is a pair of ears 58 which support an axle pin 60. An axle 62 for each pair of fore wheels 14 is provided and is slidable on the axle pin 60, the normal position being that shown by solid lines in Fig. 3 when the tractor and semi-trailer are travelling forwardly.

The fore wheels 14 are provided with brakes 66 actuated by brake actuators 68 in a manner similar to that already described for the aft wheels 16.

Extending rearwardly from the castering posts 48 are castering arms 84 connected together by a link 86 so as to provide substantially simultaneous castering action of the two sets of four wheels 14. A hydraulic snubber 88 is provided to prevent undue vibration and over travel of the castering action and one end thereof is connected to the link 86 while the other end is connected to a bracket 90 that extends downwardly from the chassis 18.

For supplying the brake actuators 46 and 68 with actuating fluid such as compressed air or brake fluid under pressure, I provide a brake fluid supply pipe 70. A brake control valve 72 is provided therefor and would be located in the cab section 20 of the tractor A so as to be convenient to the operator. An extension 71 of the pipe 70 is also shown. Fore wheel brake branches 74 and aft wheel brake branches 76 extend from the supply pipe 70 and its extension 71 to the actuators 68 and 46 respectively.

A solenoid valve 78 is provided between the pipe 70 and the pipe 71 for making it possible to render the aft wheel brakes 44 ineffective while rendering the fore wheel brakes 66 effective for a purpose which will hereinafter appear. A source of current supply 80 such as the storage battery in the tractor A is provided for the solenoid valve 78 and may be controlled by a pushbutton or the like 82 in the cab 20.

I also provide for each axle 62 a lock rod 92 that normally coacts with the axle as shown in Fig. 4 to lock this axle in either the forward castering position as shown, or the rearward castering position as shown in Fig. 3. The lock rod 92 may normally be in the locked position due to gravity and unlocked from such position by energization of a solenoid coil 94 under the control of a switch 96 also located in the cab 20.

*Practical operation*

In the operation of my wheel suspension for trailers the parts are normally in the position shown by solid lines in Fig. 3 so that the fore wheels 14 are castering for forward motion which is toward the left in Fig. 1. In Figs. 2 and 3 I show center lines C and D, C being the center line for the castering post 48 and D the center line for the axles 62.

Since the fore wheels 14 are castering in action the semi-trailer B is pulled by the tractor A the same as though it were a single axle trailer, the single axle being 24.

When it is desired to back up the tractor and semi-trailer, the push-button 96 is depressed for energizing the solenoids 94 and thereby unlocking the locking rods 92 relative to the axles 62. Then, upon backing up, the axles 62 will usually remain stationary due to friction with the ground and the semi-trailer will be moved rearwardly with the axle pins 60 sliding rearwardly relative to the axles until the axles engage the front ears 58 as in Fig. 4, whereupon the pushbutton 96 may be released for relocking the axles 62 in the forward position. The axles 62 are now at the center line E which is ahead of the castering center line C so that they will caster as the semi-trailer is backed up. The action will be the same as though the trailer were a single axle type because the fore wheels 14 will now caster in the reverse direction due to the shifting of the axle 62 from the center line D to the center line E. Obviously, the backing up of a single axle trailer is much simpler than one of the multiple axle type and, accordingly, by providing the selective reversible castering arrangement shown for the fore wheels 14 I am able to considerably simplify both the backing up operation and the proper trailing of the semi-trailer wheels relative to the tractor in the forward direction.

If additional wheels (twelve-wheel or sixteen-wheel type, etc.) are provided on the semi-trailer B they may also be arranged with the selective reversible castering construction described for the wheels 14 and there will still be the effect of a single axle trailer.

In some instances there may not be enough friction effect to cause the desired shifting of the castering action although the toe-in usually provided for steerable wheels would likewise be provided for the wheels 14 and the angle of toe-in might even be increased a little beyond normal for providing additional friction for the caster-shifting action.

In the event that there is still not enough friction or the tractor and semi-trailer are on a grade too steep for ready shifting, the valve 72 is opened and at the same time the pushbutton 82 is depressed for closing the solenoid valve 78 so that the brake actuating fluid from the pipe 70 will flow only through the branches 74 to the fore wheel brake actuator 68 for applying the brakes to the fore wheels without applying them to the back wheels. The tractor may then be backed up and in so doing the wheels 14 will be locked stationary relative to the ground surface by the application of their brakes 66 so as to positively effect the caster shifting of the axles 62 from the solid line position of Fig. 3 to the dotted line position which in Fig. 4 is from the dotted line position to the solid line position. The brakes 66 may then be released and the tractor backed up as already described.

While I have described the fore wheels as castering, the castering action can be applied to either the fore wheels or the aft wheels as desired. My claims have been worded accordingly.

Some changes may be made in the construction and arrangement of the parts of my wheel suspension for trailers and the castering action can be applied to any desired set or number of sets of wheels on a trailer without departing from the real spirit and purpose of my invention, and it is my intention to cover by my claims any modified forms of structure or use of mechanical equivalents which may reasonably be included within their scope.

I claim as my invention:

1. In a wheel suspension for a trailer having a chassis and sets of fore and aft wheels, caster mountings for one of said sets of wheels, said mountings having fore-and-aft extending guides, wheel carriers slidable along said guides to opposite positions with the wheel axes of said set behind or ahead of the castering axis, and means for locking the axles of said set at either of said positions and against return to the other position after they are slid thereto, said means comprising a lock pin, electrical means for operating said lock pin, a control circuit for said electrical means and a control switch for said circuit located in the cab of a tractor to which said trailer is hitched.

2. In a wheel suspension for a trailer having a chassis and sets of fore and aft wheels, caster mountings for one of said sets of wheels, the wheel axes of said set being selectively slidable in a fore-and-aft direction to a position behind the castering axis by pulling the trailer forwardly and to a position ahead of the castering axis by pushing the trailer rearwardly, and means to lock said set of wheels at either of said castering positions after they are slid thereto comprising a normally operable lock pin, a solenoid for rendering said lock pin inoperable when said solenoid is energized and a control circuit for said solenoid including a control switch remotely located relative to said means to lock said wheels.

References Cited in the file of this patent

UNITED STATES PATENTS

| | | |
|---|---|---|
| 1,179,736 | Manly | Apr. 18, 1916 |
| 2,042,780 | Greer | June 2, 1936 |
| 2,135,291 | Pinard | Nov. 1, 1938 |
| 2,332,326 | Lex | Oct. 19, 1943 |
| 2,377,641 | Miner | June 5, 1945 |
| 2,387,093 | Schmied | Oct. 16, 1945 |
| 2,674,464 | Peterson | Apr. 6, 1954 |